Aug. 11, 1959     A. G. FELLER     2,898,606
PORTABLE LAVATORY

Filed March 3, 1958     3 Sheets-Sheet 1

Inventor:
Arthur G. Feller,
by Gust & Dish
Attorney.

Aug. 11, 1959 A. G. FELLER 2,898,606
PORTABLE LAVATORY
Filed March 3, 1958 3 Sheets-Sheet 2
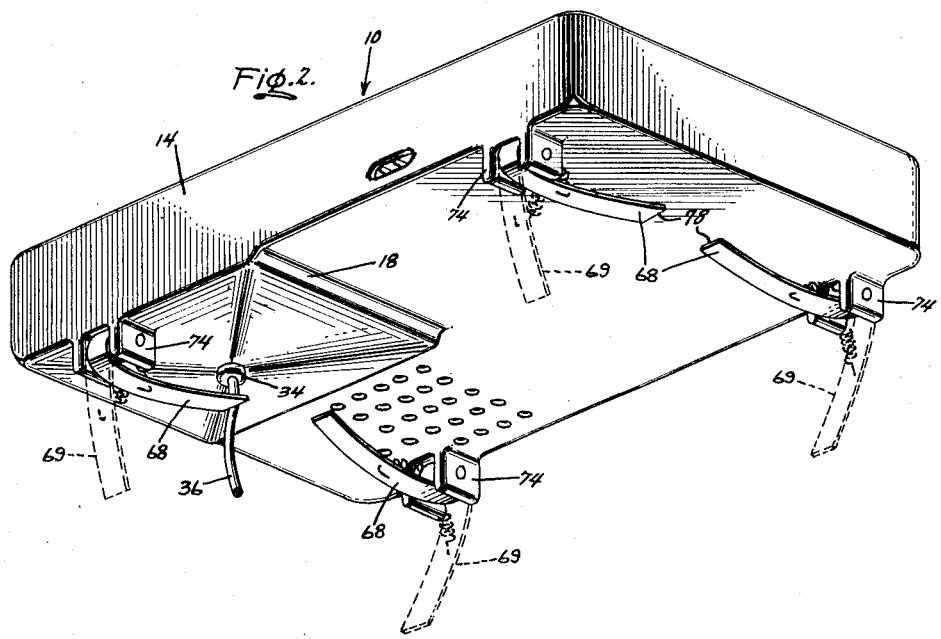
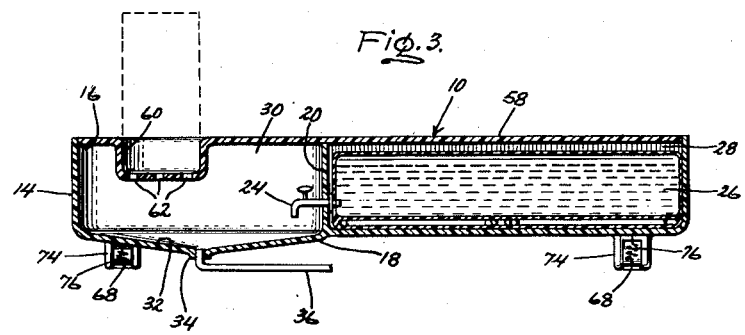
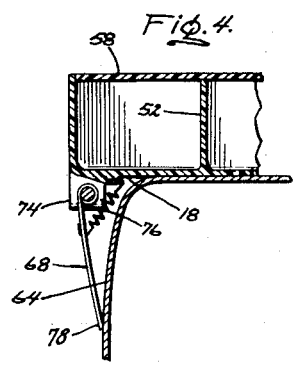
Inventor:
Arthur G. Feller,
by Gust & Disk
Attorneys.

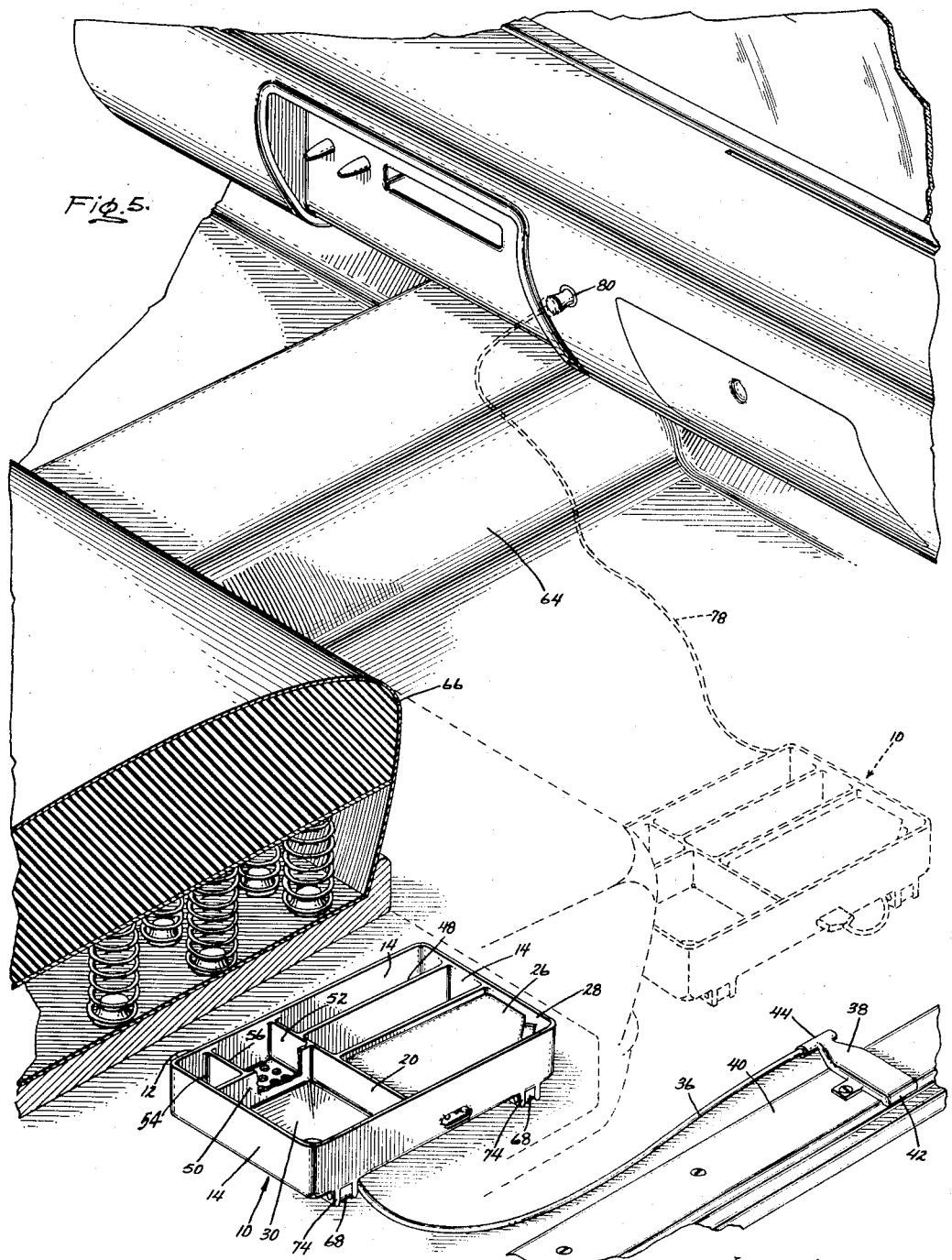

United States Patent Office 2,898,606
Patented Aug. 11, 1959

2,898,606

PORTABLE LAVATORY

Arthur G. Feller, Fort Wayne, Ind., assignor of one-half to Norman Ostermeyer, Fort Wayne, Ind.

Application March 3, 1958, Serial No. 718,534

7 Claims. (Cl. 4—166)

The present invention relates to a portable lavatory and more particularly to a lavatory which may be used in an automobile in motion.

In the field of automotive travel, it is common for the occupants to eat lunches, meals, and to partake of liquid refreshments while moving, and in cases involving children as some of the occupants, it is quite common that following eating they require washing and cleaning much the same as they do when they are at home. It is a common practice among travelers to keep a damp wash cloth in a plastic bag, and this wash cloth is used for cleaning hands and faces after eating or at any time when cleaning is required. While such a damp cloth is useful, once it becomes soiled it can no longer be used until it is washed at the next stop. Furthermore, the wash cloth has limited usefulness in the respect that it may not be of adequate size to effect all of the cleaning that is required.

This invention relates to a portable lavatory which is particularly useful in the respect that it may be used in automobiles while in motion and carries a supply of water and a wash basin which is drained to the exterior of the car. By means of this construction, it is possible for all of the occupants of an automobile to wash and refresh themselves as desired during traveling.

It is therefore an object of this invention to provide a portable lavatory which is especially adapted for use in an automobile.

It is another object of this invention to provide a portable lavatory having a supply of water and means for draining water from the lavatory to the exterior of the automobile while it is moving.

It is still another object of this invention to provide a portable lavatory having a holder for drinking cups and glasses, which is automatically drainable to the exterior of the automobile should some liquid be accidentally spilled from the drinking vessel.

Further objects will become apparent as the description proceeds.

To the accomplishment of the above and related objects, my invention may be embodied in the forms illustrated in the accompanying drawings, attention being called to the fact, however, that the drawings are illustrative only, and that specific change may be made in the specific constructions illustrated and described so long as the scope of the appended claims is not violated.

In the drawings:

Fig. 2 is a perspective view of the portable lavatory of Fig. 1 showing the underside thereof;

Fig. 3 is a longitudinal sectional view taken substantially on section line 1—1 of Fig. 1;

Fig. 4 is an enlarged fragmentary illustration of one of the gripping legs secured to the bottom of the lavatory; and Fig. 5 is a perspective illustration, partially broken away and sectioned for clarity, showing the portable lavatory of Fig. 1 stored underneath the front seat of an automobile.

Figure 1:
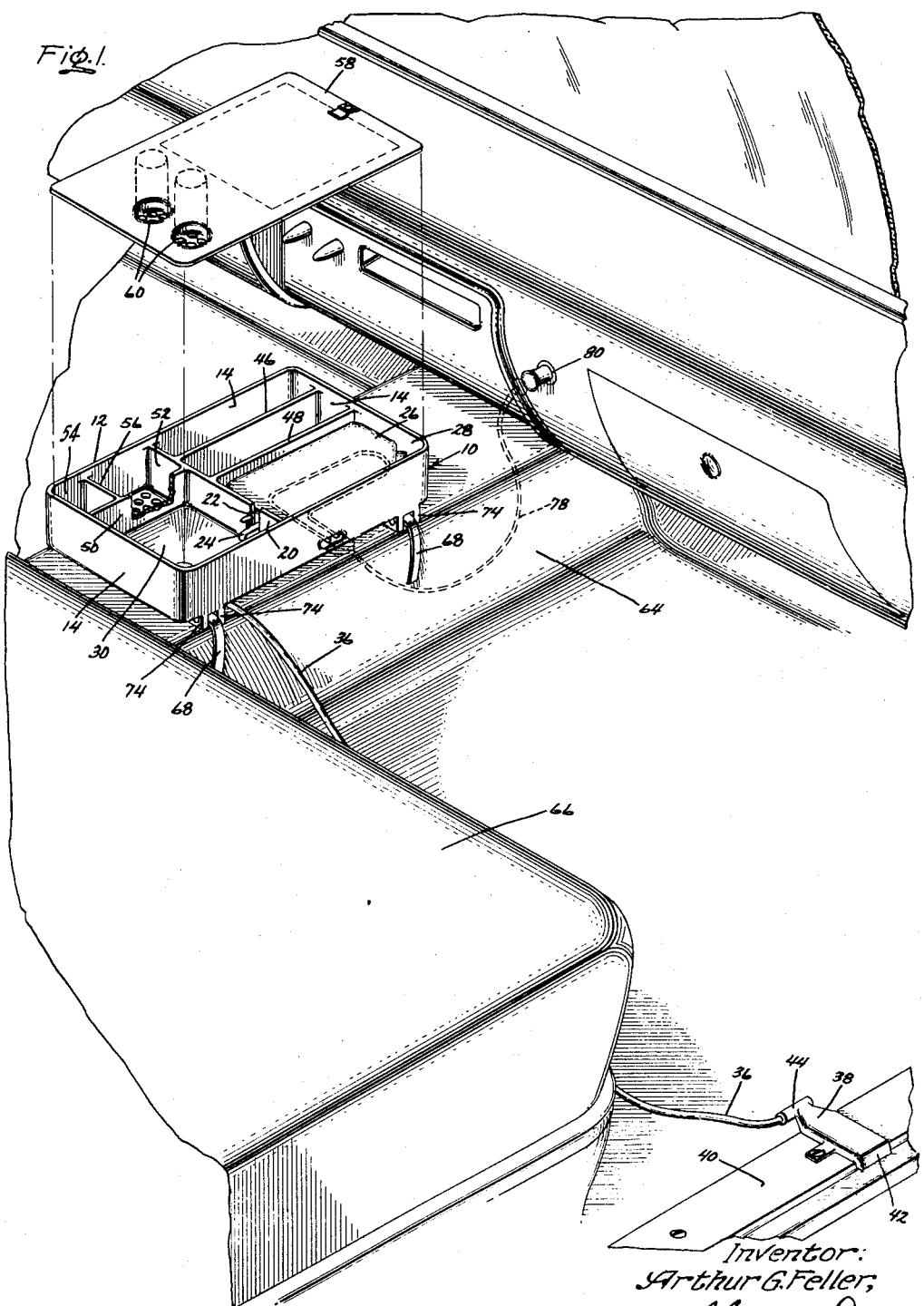
Fig. 1 is a perspective illustration of an embodiment of this invention shown as being set up for use on the transmission housing of an automobile.

Referring to the drawings, the lavatory 10 comprises a receptacle 12 which may be fabricated of any suitable material such as metal or plastic. The receptacle 12 has four sides 14, an open top 16 and a closed bottom 18, and is provided with at least one partition 20 extending between two sides 14, having a top edge which is slightly depressed below the top edge of the sides. The purpose of this depression of the partition will become apparent from the following. A slot 22 extends from the top of the partition to a point adjacent the bottom for receiving a spigot 24 extending from a water can or the like 26 which is positioned in a compartment 28 characterized as the water supply compartment. The spigot 24 extends into a second compartment characterized as a sink or wash basin 30 having a slightly tapered bottom 32 (see Fig. 3) which terminates in a drain opening 34. A flexible conduit or hose 36 is connected at one end to the drain opening 34 and extends across the floor of the automobile to a drain outlet 38 which preferably is fabricated of metal or plastic in thin form so as to pass between the sill 40 of the door frame and the door itself when it is closed. This element 38 has a passage opening at one end to the exterior of the automobile at 42 and connected at its other end 44 to the hose 36.

Additional partitions 46 and 48 (see Fig. 1) may be used for providing wash towels or food compartments, and a still further partition 50 may be provided to define two additional compartments 52 and 54 which are separated by still another partition 56. The bottom of the compartment 52 is apertured as shown for permitting air to circulate therein. From the standpoint of use, the compartment 52 receives wet or damp rags or wash cloths, whereas the compartment 54 may hold bars of soap or the like.

As is shown in Figs. 1 and 3, all of the partitions are depressed below the top edges of the sides 14 in order to receive a cover 58 having a perimeter which fits inside of the four receptacle sides 14. By means of this particular fit, any liquid spilled on the surface of the cover tends to drain into the receptacle instead of onto the floor of the automobile. While it is not desired to spill liquid at any time, it would be preferable, in the usual instance, to have any spilled liquid drain into the receptacle instead of onto the floor.

In the end of the cover 58 in registry with the wash basin 30 are two depressions or wells 60 provided with a plurality of openings 62 (Fig. 3) in the bottom thereof. These wells 60 receive drinking cups or tumblers as shown in the dashed outline of Fig. 3 and prevent the same from sliding or tipping over while the automobile is moving. The depth of the wells 60 is as deep as necessary in order to prevent tipping of the glasses or cups when a curve is rounded or a bump is struck, and in some instances may extend to almost the bottom of the basin 30. Alternatively, the well 60 may take the form of an opening only in the cover 58, the tumbler resting on the bottom 32 of the wash basin 30.

If any liquid should accidentally spill from the tumbler, it will pass downwardly into the well 60, through the opening 62 and into the compartment 30. Thus, the danger of spilling liquid onto the floor of the automobile is substantially minimized.

As viewed in Fig. 1, the portable lavatory is rested upon and clamped to the transmission housing 64 which is located about midway between the ends of the front seat 66. In this position, the lavatory is convenient to both the driver and front seat passenger and does not interfere with the driving and riding positions.

In order to so position the lavatory on the transmission housing, it is necessary to provide some kind of clamping or gripping means which will prevent the lavatory from sliding or falling off the transmission housing while the automobile is in motion. This means may take various forms, but in the illustrated embodiment of the invention comprises four gripping elements or legs 68 pivotally mounted in laterally spaced positions on the lavatory bottom 18. As seen in Fig. 4, the gripping elements 68 are pivoted at one end 70 on a hinge pin or the like 72 passing through two spaced mounting lugs 74 which depend from the bottom 18. This hinge mounting is so arranged that the gripping element 68 may be swung upwardly to the dashed line position 69 (see Fig. 4) so that all of the elements 68 may be thus retracted to reduce the overall height of the lavatory to facilitate storing the lavatory in a position under the front seat 66 as more clearly illustrated in Fig. 5. A suitable tension spring 76 is connected at one end to the element 68 and at the other end to a portion of the bottom 18 as shown in Fig. 4, so that the element 68 will at all times be urged inwardly toward the center of the lavatory. This causes all of the elements 68 yieldably to grip the sides of the transmission housing, and by providing a sharp edge 78 or serrations on the lower extremity of the element 68, each of these elements not only grip the housing but tend to dig into the covering thereby preventing the lavatory from shifting from side to side. When the lavatory is lifted off the housing 64, all of the elements 68 automatically retract to the positions as shown in Fig. 2.

In operation, the lavatory is placed in the position shown in Fig. 1. The water tank 26 is filled with water and placed in the compartment 28 with the spigot 24 being received by the partition slot 22. This places the spigot 24 inside the wash basin 30. The cover 58 is placed in position on the lavatory. If it is desired to draw water from the tank 26, the cover 58 is removed, and the spigot 24 is opened to drain water into the basin 30. By placing a plug in the drain opening 34, the basin may be partially filled with water. A wash rag normally kept in the compartment 52, which is usually dry by reason of the apertured bottom of this compartment, is used in the usual manner. Once the washing operation is completed, the drain plug is removed permitting the soiled water to drain out of the drain opening 34 through the flexible hose 36 and outside of the automobile by means of the drain outlet 38.

If it is desired to drink liquid refreshment from tumblers or cups, the cover 58 is placed back on the lavatory, and the filled tumblers are set in the wells 60 which are positioned inside of the wash basin 30. Any spillage of liquid from the tumblers while they are sitting in the respective wells will automatically be drained away via the wash basin and drain outlet 38. Hence, the lavatory construction is most convenient and versatile in the respect of providing a surface for receiving tumblers filled with liquid refreshment, the lavatory carrying away any spillage, and for the second purpose of serving as a wash basin having its own supply of water and drain.

When the lavatory is not being used, it is merely lifted off the housing 64 and slid under the front seat as shown in Fig. 5.

In some instances it may be desirable to provide heated water, and this is accomplished by mounting an electrical heater in the bottom of the water tank 26 and connecting a power cord 78 thereto which may be inserted in the usual cigar lighter receptacle 80 as shown in both Figs. 1 and 5.

What is claimed is:

1. A portable lavatory comprising a receptacle having an open top and closed sides and bottom, said top and bottom being substantially flat and parallel, at least two curved gripping legs spaced apart on said bottom for engaging the opposite sides of an automobile transmission housing; said gripping legs each comprising a pair of spaced depending lugs on said bottom, a hinge pin through said lugs, an elongated bar hingedly mounted at one end on said pin and fitting between said lugs, the other end of said bar having a sharp edge, a spring connected between said bar and said receptacle urging said bar inwardly toward the center thereof, both of said bars thereby being urged inwardly toward each other; said receptacle having at least one partition providing two compartments, said partition having an open-ended slot for receiving the spigot of a water tank, a drain opening in the bottom of one compartment, a drain conduit connected to said drain opening, a draining element of rigid material and having a passage therethrough, said draining element being connected to said drain conduit and being adapted to be mounted on the door sill of an automobile door, said element further being flat so as to fit between the sill and door when the latter is closed, a substantially flat cover removably closing said receptacle top, the perimeter of said cover fitting inside the receptacle sides, at least one depression in said cover in registry with said one compartment, said depression having at least one opening in the bottom thereof.

2. A portable lavatory comprising a receptacle having an open top and closed sides and bottom, said top and bottom being substantially flat and parallel, said receptacle having at least one partition providing two compartments, said partition having an open-ended slot for receiving the spigot of a water tank, a drain opening in the bottom of one compartment, a drain conduit connected to said drain opening, a draining element of rigid material and having a passage therethrough, said draining element being connected to said drain conduit and being adapted to be mounted on the door sill of an automobile door, said element further being flat so as to fit between the sill and door when the latter is closed, a substantially flat cover removably closing said receptacle top, the perimeter of said cover fitting inside of the receptacle sides, at least one depression in said cover in registry with said one compartment, said depression having at least one opening in the bottom thereof.

3. A portable lavatory comprising a receptacle having an open top and closed sides and bottom, said top and bottom being substantially flat and parallel, at least two gripping legs spaced apart on said bottom for engaging the opposite sides of an automobile transmission housing; said gripping legs each comprising a pair of spaced depending lugs on said bottom, a hinge pin through said lugs, an elongated bar hingedly mounted at one end on said pin and fitting between said lugs, a spring connected between said bar and said receptacle urging said bar inwardly toward the center thereof, both of said bars thereby being urged inwardly toward each other; said receptacle having at least one partition providing two compartments, said partition having an open-ended slot for receiving the spigot of a water tank, a substantially flat cover removably closing said receptacle top, the perimeter of said cover fitting inside of the receptacle sides, at least one depression in said cover in registry with one compartment, said depression having at least one opening in the bottom thereof.

4. A portable lavatory comprising a receptacle having an open top and closed sides and bottom, said top and bottom being substantially flat and parallel, at least two gripping legs spaced apart on said bottom for engaging the opposite sides of an automobile transmission housing; said gripping legs each comprising a depending elongated member hingedly mounted on said bottom, a device yieldably urging said elongated member toward the center of said receptacle; said receptacle having at least one partition providing two compartments, said partition having an open-ended slot for receiving the spigot of a water tank, a drain opening in the bottom of one compartment, a drain conduit connected to said drain opening, a draining element of rigid material and having a passage therethrough, said draining element being connected to said drain conduit and being adapted to be mounted on the door sill of an automobile door, said element further being flat so as to fit between the sill and door when the latter is closed, a substantially flat cover removably closing said receptacle top, the perimeter of said cover fitting inside of the receptacle sides, at least one depression in said cover in registry with said one compartment, said depression having at least one opening in the bottom thereof.

5. A portable lavatory comprising a receptacle having an open top and closed sides and bottom, said top and bottom being substantially flat and parallel, at least two gripping legs spaced apart on said bottom for engaging the opposite sides of an automobile transmission housing; said gripping legs each comprising a depending elongated member hingedly mounted on said bottom, a device yieldably urging said elongated member toward the center of said receptacle; said receptacle having at least one partition providing two compartments, said partition having an open-ended slot for receiving the spigot of a water tank, a substantially flat cover removably closing said receptacle top, the perimeter of said cover fitting inside of the receptacle sides, at least one depression in said cover in registry with one compartment, said depression having at least one opening in the bottom thereof.

6. The lavatory of claim 1 and including a second partition extending across one of said compartments for providing a third compartment, a plurality of apertures in said third compartment providing for the circulation of air therethrough.

7. A portable lavatory comprising a receptacle having an open top and closed sides and bottom, said top and bottom being substantially flat and parallel, at least two gripping legs spaced apart on said bottom for engaging the opposite sides of an automobile transmission housing; said gripping legs each comprising a depending elongated member hingedly mounted on said bottom, a device yieldably urging said elongated member toward the center of said receptacle; said receptacle having at least one partition providing two compartments, a drain opening in the bottom of one compartment, a drain conduit connected to said drain opening, a draining element of rigid material and having a passage therethrough, said draining element being connected to said drain conduit and being adapted to be mounted on the door sill of an automobile door, said element further being flat so as to fit between the sill and door when the latter is closed.

References Cited in the file of this patent

UNITED STATES PATENTS

| | | |
|---|---|---|
| 331,866 | Carter | Dec. 8, 1885 |
| 457,262 | De Neut | Aug. 4, 1891 |
| 1,364,809 | Robbins | Jan. 4, 1921 |

FOREIGN PATENTS

| | | |
|---|---|---|
| 497,869 | Germany | May 15, 1930 |